(12) United States Patent
Lee

(10) Patent No.: US 10,371,184 B2
(45) Date of Patent: Aug. 6, 2019

(54) DEVICE FOR SECURING CHANNEL LETTER PLATES

(71) Applicant: Seoul Laser Dieboard System Co., Ltd., San Diego, CA (US)

(72) Inventor: Sang Moo Lee, Seoul (KR)

(73) Assignee: SEOUL LASER DIEBOARD SYSTEM CO. LTD., Foothill Ranch, CA (US)

( * ) Notice: Subject to any disclaimer, the term of this patent is extended or adjusted under 35 U.S.C. 154(b) by 658 days.

(21) Appl. No.: 15/093,609

(22) Filed: Apr. 7, 2016

(65) Prior Publication Data

US 2016/0298665 A1 Oct. 13, 2016

Related U.S. Application Data

(60) Provisional application No. 62/144,201, filed on Apr. 7, 2015.

(51) Int. Cl.
*F16B 5/06* (2006.01)
*G09F 13/04* (2006.01)
*B21D 53/36* (2006.01)

(52) U.S. Cl.
CPC ............ *F16B 5/0614* (2013.01); *B21D 53/36* (2013.01); *G09F 13/0404* (2013.01)

(58) Field of Classification Search
CPC ..... G09F 7/00; G09F 7/08; G09F 7/18; G09F 7/1847; Y10T 403/7105; Y10T 403/7141; F16B 7/04; F16B 7/0433; F16B 7/048; F16B 7/0486; F16B 7/0493; F16B 5/0607; F16B 5/0621
See application file for complete search history.

(56) References Cited

U.S. PATENT DOCUMENTS

| | | | | |
|---|---|---|---|---|
| D314,503 S | * | 2/1991 | Gilman | D8/394 |
| 6,167,740 B1 | * | 1/2001 | Lipari | B21D 7/00 72/306 |
| 6,585,207 B2 | * | 7/2003 | Ibbitson | B01L 9/50 248/229.2 |
| 9,126,252 B2 | * | 9/2015 | Lim | B21D 11/08 |
| 9,702,503 B2 | * | 7/2017 | Chi Man | F16M 13/022 |
| 9,721,486 B2 | * | 8/2017 | Yoon | G09F 13/0404 |
| 2002/0104241 A1 | * | 8/2002 | Grate | G09F 13/04 40/552 |
| 2005/0005746 A1 | * | 1/2005 | Linenberger | B21D 11/08 83/39 |
| 2015/0224555 A1 | * | 8/2015 | Lim | B21D 11/08 72/324 |
| 2016/0297015 A1 | * | 10/2016 | Lee | B23D 37/10 |

* cited by examiner

*Primary Examiner* — Jonathan P Masinick
(74) *Attorney, Agent, or Firm* — Procopio, Cory, Hargreaves & Savitch LLP

(57) ABSTRACT

Methods and devices for making a plate clip for securing a plate to a channel letter including: selecting a size of the plate clip and cutting a clip form; selecting a plurality of fold positions of the plate clip based on a panel size, the panel size being based on a plate thickness and a width of a rib; cutting the clip form to form a plurality of barbs; and folding the clip form at the plurality of fold positions to form the plate clip and expose the plurality of barbs.

5 Claims, 16 Drawing Sheets

DEVICE FOR SECURING CHANNEL LETTER PLATES

CROSS-REFERENCE TO RELATED APPLICATIONS

This application claims the benefit of priority under 35 U.S.C. § 119(e) of U.S. Provisional Patent Application No. 62/144,201, filed Apr. 7, 2015, entitled "Device for Securing Channel Letter Covers."

BACKGROUND

Technological Field

The present disclosure relates to channel letters, and more specifically, to systems and devices for securing channel letter plates. More specifically, this disclosure relates to clips for securing back plates of channel letters.

Related Art

Channel letters can be manufactured from metal rules and profiles having one or more ribs. The ribs can provide a surface onto which a face plate or bottom plate can be secured when completing the channel letter.

SUMMARY

In general, this disclosure describes systems and methods related to devices for securing plates to complete channel letters. As used herein, a "plate" can generally refer to a panel that is secured to the front (face plate) or back (bottom plate) of a channel letter. In some examples, the plate may further include a center panel or plate secured to, for example, a center rib of channel letter.

A metal profile having one or more ribs can be scored or cut and folded to create an outline of a channel letter. A "channel letter" as used herein can refer generally to letters, numbers, or other shapes that can be formed using the profiles. Once the profile is scored or cut and folded to construct the outline of the channel letter, plates can be installed in order to complete the channel letter and provide structural support.

In some embodiments disclosed herein, the plates can be installed using one or more metal clips. The clips can be formed to secure to a bottom rib of the interior portion of the channel letter. The clips can also provide a mounting surface for the bottom plate. The clips can also have one or more barbs that secure the clip to the rib and the bottom plate.

The systems, methods, and devices of this disclosure each have several innovative aspects, no single one of which is solely responsible for the desirable attributes disclosed herein.

One aspect of the disclosure provides method for making a plate clip for securing a bottom plate to a channel letter. The method can includes: selecting a size of the plate clip and cutting a clip form; selecting a plurality of fold positions of the plate clip based on a panel size, the panel size being based on a plate thickness and a width of a rib; cutting the clip form to form a plurality of barbs; and folding the clip form at the plurality of fold positions to form the plate clip and expose the plurality of barbs.

Another aspect of the disclosure provides a device for securing a plate to a channel letter. The device includes: a top gap having a top gap width and a top gap depth and sized to receive a rib, the rib being adhered to a profile used to make a channel letter; a bottom gap oriented opposite to the top gap and sized to receive the plate of the channel letter; a first plurality of barbs, each barb of the first plurality of barbs being oriented toward an inside of the top gap and configured to fit between the rib and the profile; and a second plurality of barbs, each barb of the second plurality of barbs oriented toward an inside of the bottom gap and configured to penetrate a surface of the plate.

Other features and advantages of the present disclosure should be apparent from the following description which illustrates, by way of example, aspects of the disclosure.

BRIEF DESCRIPTION OF THE DRAWINGS

The details of the present disclosure, both as to its structure and operation, may be gleaned in part by study of the accompanying drawings.

DETAILED DESCRIPTION

Figure 1:
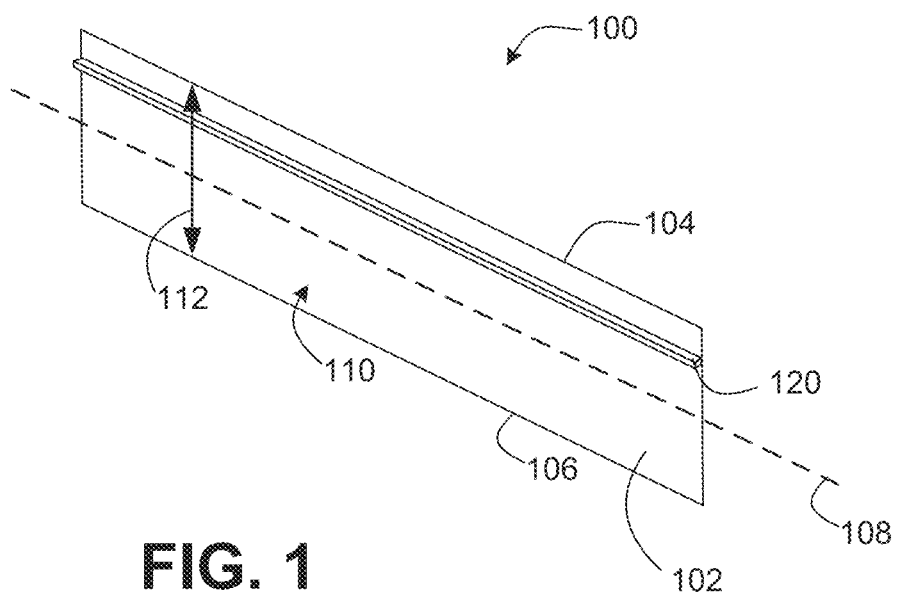
FIG. 1 is a perspective view of a profile having one rib.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. In some instances, well-known structures and components are shown in simplified form for brevity of description. As used herein, like reference numerals refer to like features throughout the written description.

FIG. 1 is a perspective view of a portion of a profile. As shown, a profile 100 can comprise a rule 102. As described herein, a "rule" may generally refer to a flat metallic strip. Additionally, a "profile" as used herein may generally refer to the rule 102 having a rib 120 as described herein.

The profile 100 can have a first edge, or a top edge 104 and a second edge, or bottom edge 106. The top edge 104 and the bottom edge 106 may generally define a rectangular shape. The top edge 104 and the bottom edge 106 can be parallel to a profile axis 108. The profile axis 108 may be a longitudinal axis of the profile, between the top edge 104 and the bottom edge 106 of the profile 100.

In some embodiments, the profile 100 can further have a first surface 110. The first surface 110 may also be referred to herein as a front surface or "inside surface," indicating that the first surface 110 may generally become the inside of a resulting channel letter once the profile 100 has been cut and folded. The profile 100 (or the rule 102) can generally have a profile height 112 on the order of a few centimeters (cm), for example, one or two cm to in excess of 20 cm. The profile height 112 can also describe the height of the first surface 110. The profile 100 may also be many meters long (in the direction of the profile axis 108). As described below in connection with FIG. 5, the profile 100 (and the rule 102) can be stored in large rolls from which certain portions or lengths can be cut, for example, to produce the portion of the profile 100 shown. Lengths or sections of the profile 100, can be cut from the rolls and then fed into a profile cutting and bending machine (not shown) to make a variety of channel letters or shapes from the profile 100.

In some embodiments, the rule 102 can be formed of a suitable metallic material, such as aluminum, steel, stainless steel, or various other alloys that provide a malleable, yet sturdy construction. The rule 102 may further have a protective coating to prevent corrosion or oxidation and to provide a suitable mounting surface for the rib 120. Such a protective coating can be applied at least to the first surface 110, but can also be applied to an outside surface (not shown). The outside surface is opposite the first surface 110 and may generally become the outside of the resulting channel letter once the profile 100 is cut and folded. In certain embodiments, such a protective coating may be an enamel coating. In some other embodiments, the profile 100 can be coated with certain types of powder coating, lacquer, or paint applied to the entire rule 102. In some embodiments, coating the rule 102 in enamel can have certain chemical advantages for adhering or bonding of the rib 120 as described below in connection with FIG. 6. The coating can further have desirable artistic or design characteristics provided by different colored coatings having various reflective or textured properties. For example, a white first surface 110 may have desirable reflective properties for light emitted from within a completed channel letter. The colors and coatings of the first surface 110 can be different from the colors and coatings of the outside surface.

The profile 100 can further have the rib 120. The rib 120 can be one of several ribs as shown below in the following figures. In some embodiments, the rib 120 can be attached, bonded, or otherwise adhered to the rule 102. In some embodiments, the rib can be formed of a polymer, elastomer, plastic, fiber-reinforced plastic (FRP), or other suitable synthetic materials. In some other embodiments, the rib 120 can be attached using a machine that applies or adheres the rib 120 in place upon a blank rule 102.

Once the profile 100 is cut (see FIG. 11) and folded (see FIG. 15) the rib 120 can provide a mounting point for a face plate (see FIG. 9 and FIG. 16) to complete the channel letter. The composition or materials of the rib 120 and the face plate are then important for proper bonding as described below.

Figure 2:
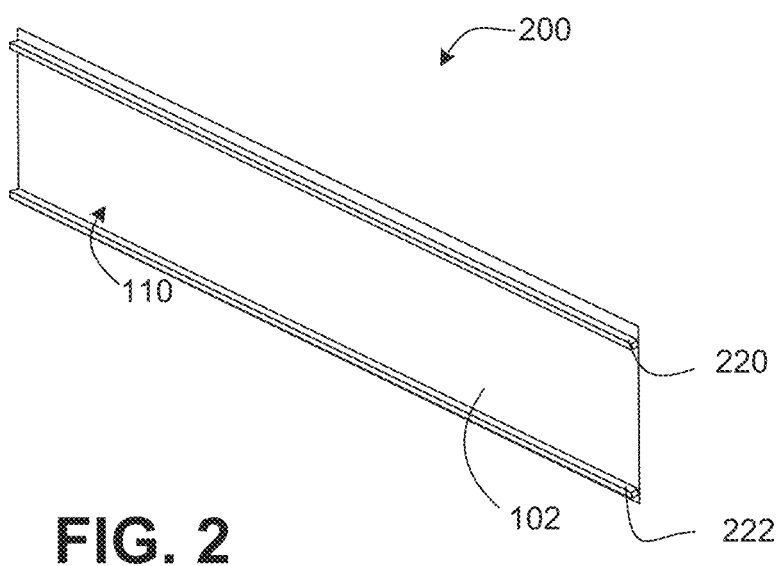
FIG. 2 is a perspective view of a profile having two ribs.

FIG. 2 is a perspective view of another embodiment of a profile. As shown, a profile 200 is similar to the profile 100, having the rule 102. The profile 200 can further have a rib 220 and a rib 222 adhered to the first surface 110. In some embodiments, the profile 200 can then be similar to the profile 100 with the additional rib 222. Similar to the rib 120 (FIG. 1), the rib 220 can provide a mounting point for a face plate (see FIG. 9). The second rib 222 can further provide a second mounting point for a back plate or bottom plate or other mounting options as described below.

Figure 3:
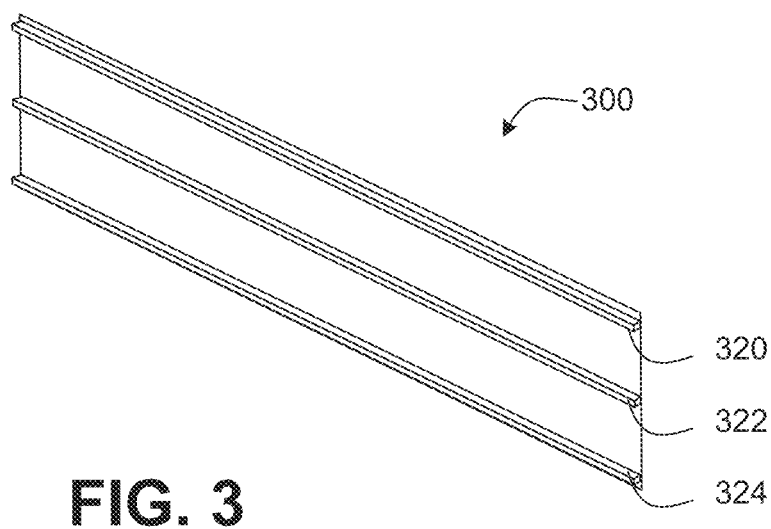
FIG. 3 is a perspective view of a profile having three ribs.

FIG. 3 is a perspective view of another embodiment of a profile. As shown, a profile 300 can have the rule 102, similar to the profile 100 and the profile 200. The profile 300 can have a rib 320, a rib 322, and a rib 324 for a total of three ribs in this embodiment. The various numbers of ribs can provide additional structural support and design options. A central plate (not shown) or a back plate (see FIG. 9) can be bonded to one or more of the ribs 322, 324 in order to install various electronics or lights. In some embodiments, the ribs 320, 322, 324 can be referred to using their relative positions as a descriptor. For example, the rib 320 can be a "top rib," the rib 322 can be an "intermediate rib," and the rib 324 can be a "bottom rib."

Figure 4:
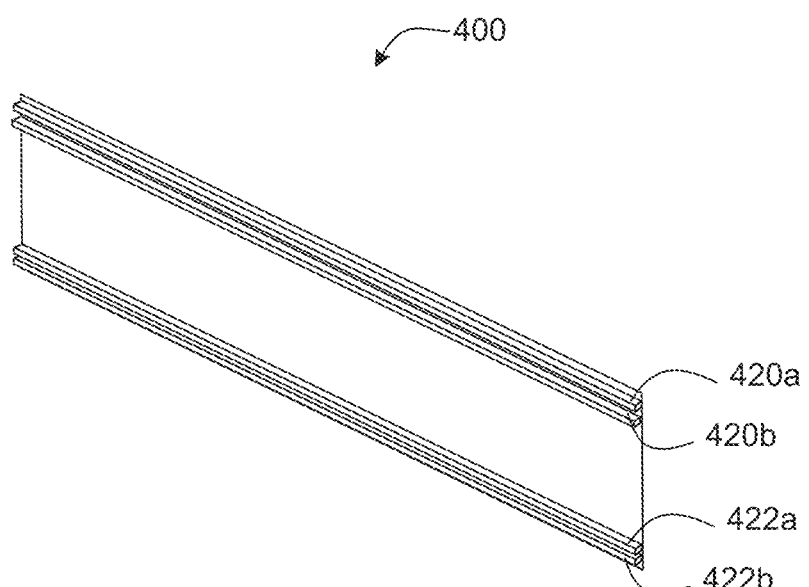
FIG. 4 is a perspective view of a profile having two pairs of ribs.

FIG. 4 is a perspective view of another embodiment of a profile. As shown, a profile 400 can have the rule 102, similar to above. The profile 400 can further have a first pair of ribs 420 and a second pair of ribs 422. The first pair of ribs 420 is shown as a rib 420a and a rib 420b, while the second pair of ribs 422 is shown as a rib 422a and a rib 422b. The profile 400 can have features and construction similar to the previously described profiles 100, 200, 300, wherein the first pair of ribs 420 and the second pair of ribs 422 are adhered to the rule 102 to form the profile 400.

Though FIG. 1-FIG. 4 were described separately, each of the embodiments were described to illustrate the variable number of ribs that may be utilized in the formation of channel letters as described herein. While certain aspects may be described in relation to a single profile, each of the profiles 100, 200, 300, 400, may be adapted for use in connection with the methods and other profile configurations described below.

Figure 5:
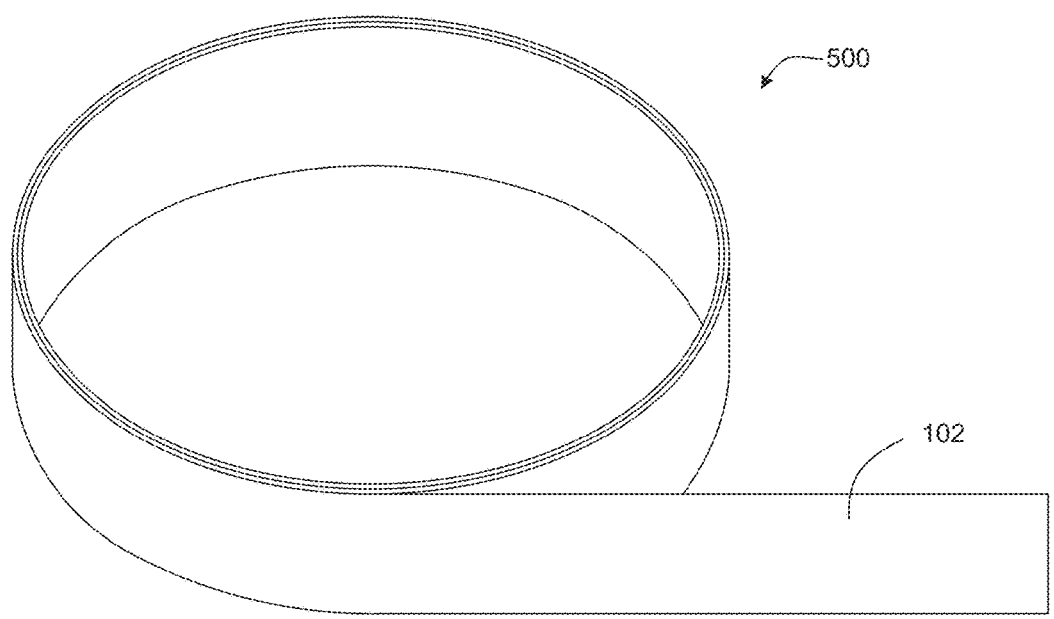
FIG. 5 is a perspective view of a roll of rule.

FIG. 5 is a perspective view of a roll of rule. The rule 102 (FIG. 1, for example) may be stored in large rolls such as a roll 500. The roll 500 can have several hundred meters of the rule 102 stored. Since the metallic material from which the rule 102 is formed is generally flexible, it is readily rolled and can be stored and transported accordingly.

Figure 6:
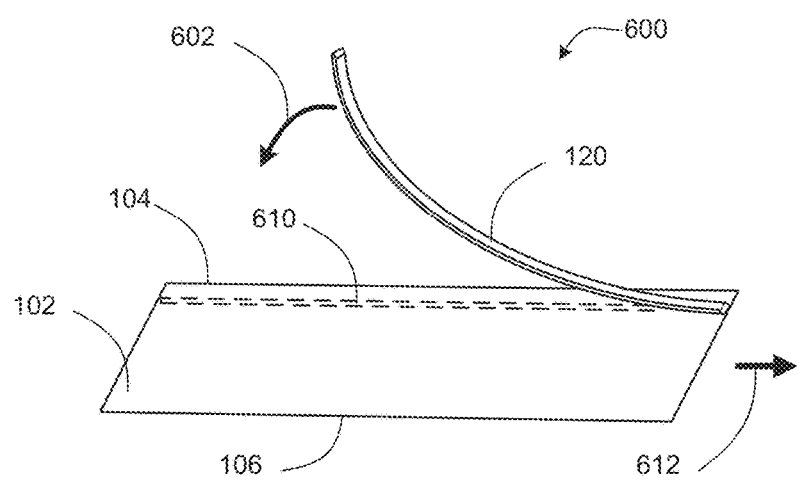
FIG. 6 is a perspective view of a rib as applied to a rule to form a profile.

FIG. 6 is a perspective view of a rib as applied to a rule to form a profile. As shown, the rib 120 can be applied to a section 600 of the rule 102. In some embodiments, the section 600 may be a portion of the rule 102 that is cut from or part of the roll 500. The rib 120 can be applied to the rule 102 in a direction indicated by an arrow 602. The rib 120 can be adhered to the rule 102 using a layer or layers of adhesive 610 (shown in dashed lines). In some embodiments, the rib 120 can be applied to the rule 102 in the section 600 as shown. In some other embodiments, long portions of the rib 120 can be applied to long sections 600 of the rule 102 that is unrolled from the roll 500 and/or cut to a desired length. In some embodiments, the resulting profile 100 can be rolled back up and stored or transported.

In some embodiments, the nature and composition of the materials used in forming the profile 100 can be significant. Various glues or bonding agents such as the adhesive 610 can be selected for their characteristics and ability to bond given materials (e.g., metal to plastic or plastic to plastic). In some embodiments, the adhesive 610 may be selected from those bonding agents specifically formulated for bonding two synthetic materials such as a variety of plastics, acrylic, elastomers, or other polymers as described herein. The rule 102 can be coated with an enamel coating that protects or provides a desired finish or color for the interior (e.g., the first surface 110) and exterior (e.g., the outside surface) of a completed channel letter. Accordingly, the adhesive 610 can be selected to provide or form an optimum bond between, for example, the rule 102 having an enamel coating and a plastic rib 120. The plastic rib 120 can then be easily bonded to an acrylic face plate (see FIG. 9) or other similar material. The adhesive 610 for bonding similar substrates, such as plastics, may be more readily available, less expensive, and provide more resilient and permanent bonds. Thus such an adhesive may provide certain benefits over those for bonding, for example, a plastic rib 120 to an unfinished metal rule 102. In some embodiments, the adhesive 610 optimized for bonding metal to plastic can further be more expensive or more difficult to obtain than the adhesive 610 formulated to permanently bond two synthetic materials such as plastics and other polymers as described herein.

In some embodiments, certain bonding agents for bonding plastics and various other synthetic materials to themselves can create molecular bonds between adjacent surfaces. Such bonding agents as certain glues, one-part or two-part epoxy formulations, and certain solvent type agents, can weld a plastic or an acrylic rib 120 to the enamel coating of the rule 102. Such bonding agents may be less expensive than those that can provide an equally effective bond between a metal (e.g., an unfinished metal rule 102) and the (plastic) rib 120. Such bonding agents may not be readily available or cost effective for large scale use as the adhesive 610. Similar bonding agents may be used for bonding a face plate (see FIG. 9) to the rib 120 and the rule 102.

Figure 7:
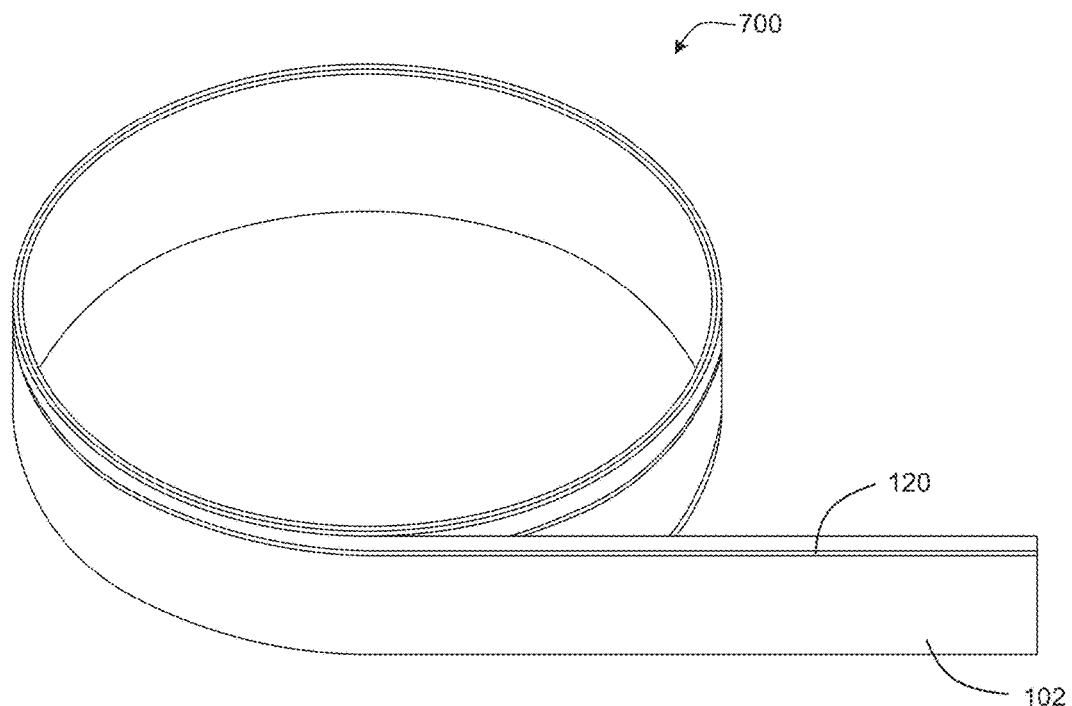
FIG. 7 is a perspective view of a roll of profile.

FIG. 7 is a perspective view of a roll of profile. A roll of profile 700 can be formed as the rib 120 is applied to the rule 102. In some embodiments, the roll 500 can be unrolled in a specially configured machine (not shown) that can apply the layer of adhesive 610 to which the rib 120 is then applied. Such a machine can be configured to unroll the roll 500, apply the adhesive 610, apply the rib 120, and roll the completed profile 100 into the roll of profile 700. The roll of profile 700 can be stored and later used for the production of channel letters using the profile 100. The roll of profile 700 can have one or more ribs 120, similar to the previously described profiles, for example, the profiles 100, 200, 300, 400.

Figure 8:
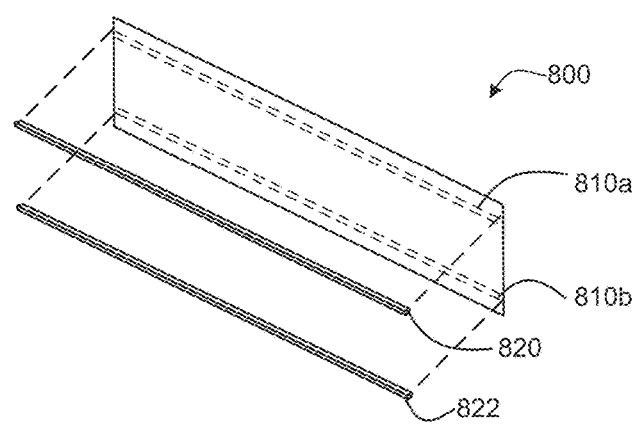
FIG. 8 is a perspective view of a profile being formed with two rib.

FIG. 8 is a perspective view of a profile being formed with two ribs. A profile 800 is shown as a rib 820 and a rib 822 are being applied to the rule 102. The rib 820 and the rib 822 can be similar to the previously disclosed ribs in the preceding figures, for example the rib 220 and the rib 222 (FIG. 2). Each of the rib 820 and the rib 822 can be secured to the rule 102 through the use of an adhesive 810. The adhesive 810 is shown as adhesive 810*a* and adhesive 810*b* corresponding to the rib 820 and the rib 822. The adhesive 810 can be similar to the adhesive 610.

Figure 9:
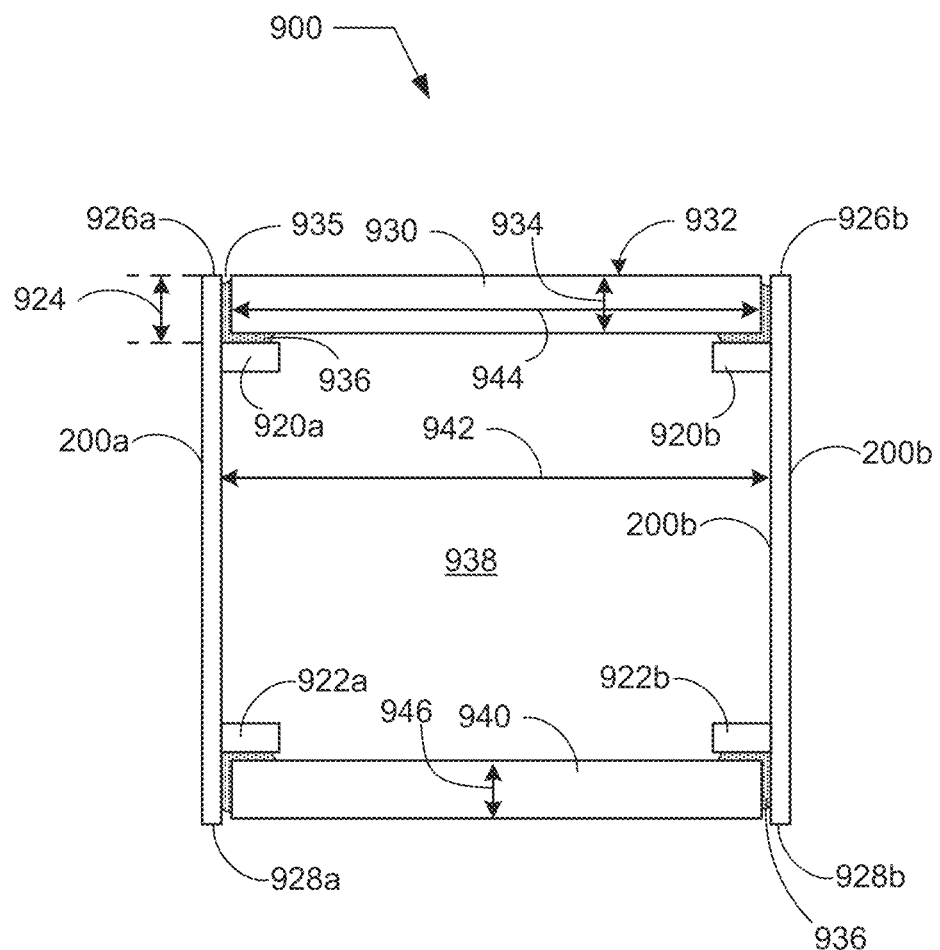
FIG. 9 is a sectional view of a portion of an exemplary channel letter.

FIG. 9 is a sectional view of a portion of an exemplary channel letter. A portion of a channel letter 900 is shown using the profile 200 of FIG. 2. The section is taken along a line 9-9 of FIG. 16, described below. As shown, a profile 200*a* and a profile 200*b* are used in the formation of the channel letter 900. In some embodiments, any of the other previously described profiles 100, 300, 400 can be used in a similar manner to form the channel letter 900.

In some embodiments, the portion of the channel letter 900 shown can be formed of a single length of the profile 200. Therefore in some embodiments, the profile 200*a* and the profile 200*b* can be two portions of the same length of bended profile. The profile 200*a* and the profile 200*b* may be referred to collectively as the profiles 200.

The profile 200*a* can have a top rib 920*a* and a bottom rib 922*a*. Similarly, the profile 200*b* can have a top rib 920*b* and a bottom rib 922*b*. The top rib 920*a* and the top rib 920*b* (collectively referred to as "top ribs 920") can be similar to, for example, the rib 120, the rib 220, or the other ribs described in connection with the preceding figures. The ribs 920*a*, 920*b* and the ribs 922*a*, 922*b* are distinguished for purposes of description.

The top ribs 920 can be located a distance 924 from a top edges 926 of the profiles 200. The top edges 926 can be similar to the top edge 104 of FIG. 1. In an embodiment, the distance 924 provides sufficient space to receive a face plate 930 such that a top surface 932 of the face plate 930 is flush with the top edge 926 of the profile 200*a* when the channel letter 900 is completed. Accordingly, the face plate 930 can have a face plate thickness 934 that is slightly smaller than the distance 924, such that there is a gap 935 between the adjacent portions of the rib 920, the rule 102, and the face plate 930.

In some embodiments, the profile 200*a* and the profile 200*b* can be separated by a distance 942. The distance 942 can be slightly larger than a face plate width 944. Accordingly, the profiles 200 may be spaced apart such that the channel letter 900 can receive the face plate 930 with a clearance fit. The gap 935 may therefore be formed or otherwise configured to receive an adhesive 936, for example, a bonding agent similar to the adhesive 610. In some embodiments, the adhesive 936 used for bonding the face plate 930 to the rib 920 and the rule 102 may be an adhesive specifically designed for bonding plastics or other polymers. The adhesive 936 may further create a permanent bond or weld between the face plate 930 and the ribs 920.

Figure 15:
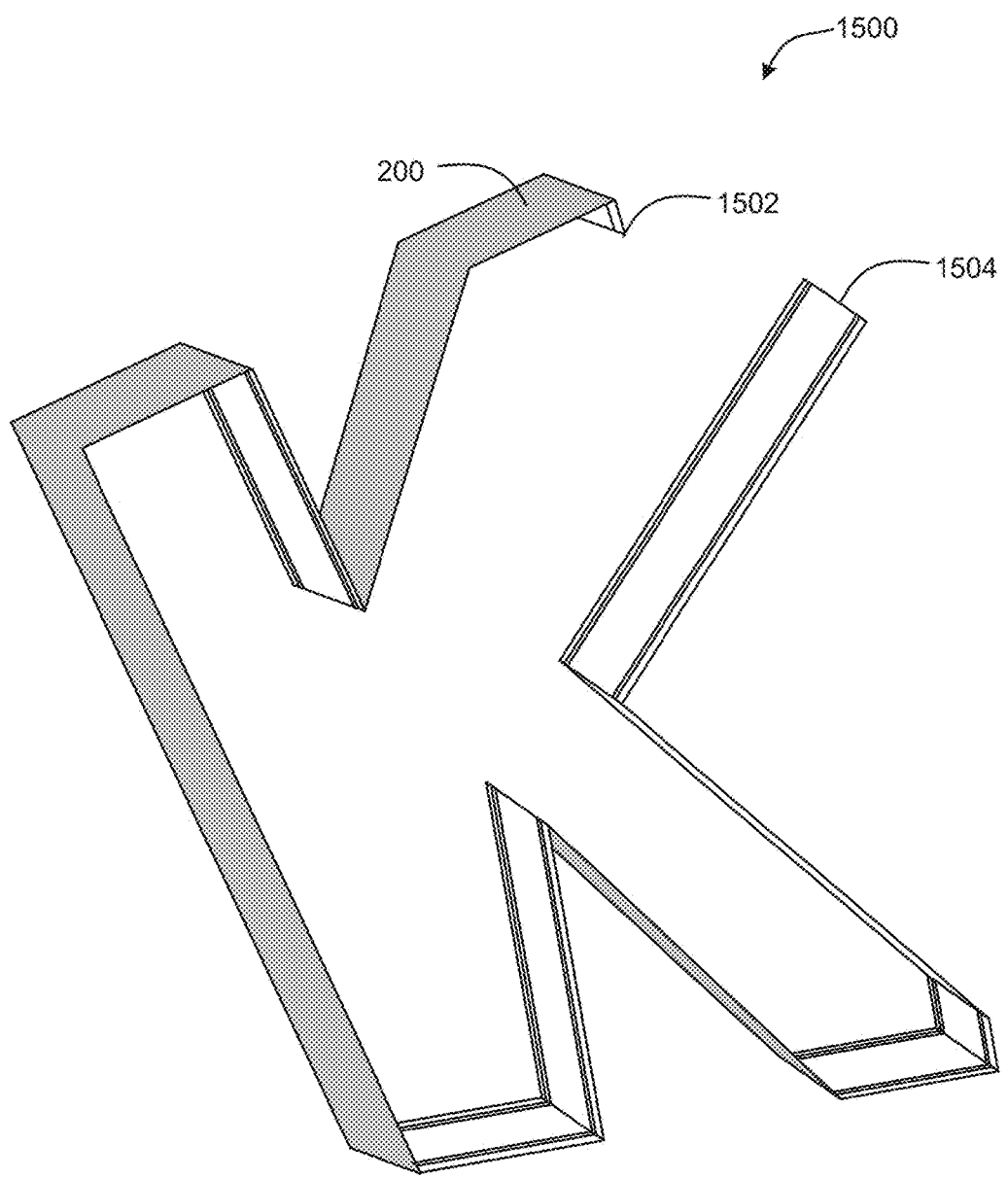
FIG. 15 is a perspective of a channel letter formed from a profile.
Figure 16:
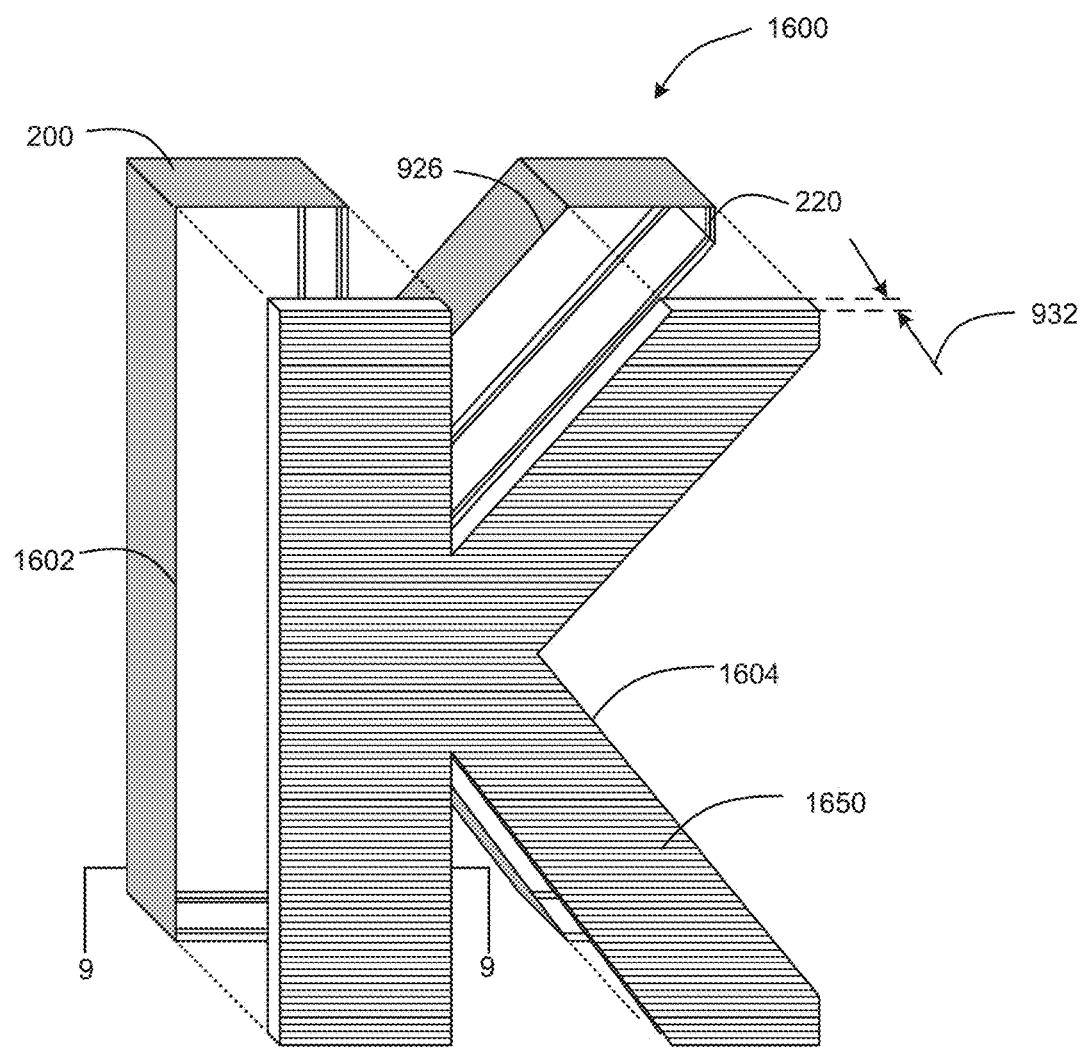
FIG. 16 is a perspective view of the completed channel letter of FIG. 15 fitted with a face plate.

In some embodiments, the face plate 930 can be formed of a certain plastic or other polymer and may form the outline of a particular letter (e.g., a "k") or other possible form (see FIG. 15, FIG. 16). In some embodiments, the face plate 930 can have a translucent or transparent structure formed from certain acrylics or other plastics, thereby allowing light to pass through the face plate 930.

In certain embodiments, the top surface 932 of the face plate 930 is flush with the top edges 926 of the profile 200*a* and the profile 200*b* in the completed channel letter 900. This may provide certain aesthetic advantages because there is no further bending or forming required of the face plate 930 to flange or wrap it over the top edges 926. The face plate 930 may be cast, molded, or formed to the specific interior dimensions (e.g., the face plate width 944 slightly smaller than the distance 942) of the completed channel letter 900 and secured in place with the adhesive 936. In some embodiments, the adhesive 936 may form a water tight seal between the face plate 930 and the profiles 200, thereby protecting the contents of the channel letter 900, such as one or more lights or certain electronics. Accordingly, the channel letter 900 may further have a central space 938 sized to accommodate one or more lights that can project through the face plate 930.

The profile 200*b* and its components can be arranged in a similar manner as the profile 200*a*. Certain reference numerals are not repeated for the rib 220*b* for brevity.

In certain embodiments, the channel letter 900 may further have a bottom plate 940. The bottom plate 940 may be similar to the face plate 930 and be formed to fit between the profiles 200 in a similar manner to the face plate 930. The bottom plate can further have similar dimensions as the face plate 930. For example, the bottom plate 940 can have a bottom plate thickness 946. The bottom plate thickness 946 can be similar to the face plate thickness 934. Accordingly, the bottom plate 940 can be fit between and be secured to a rib 922a and a rib 922b near bottom edges 928a, 928b (collectively referred to as bottom edges 928) of the profiles 200. Thus the bottom plate 940 may be secured in place between the profiles 200 by the adhesive 936, similar to that described above. The bottom plate 940 can further be secured to a wall or other mounting surface in certain implementations. The bottom plate 940 can further be flush with the bottom edges 928 in the channel letter 900 when bonded in place. In another embodiment, the bottom plate 940 can be formed of a translucent or transparent material, such as for example, acrylic. In still another embodiment, the bottom plate 940 can be a portion of a larger structure formed to support a series of channel letters 900.

Figure 10:
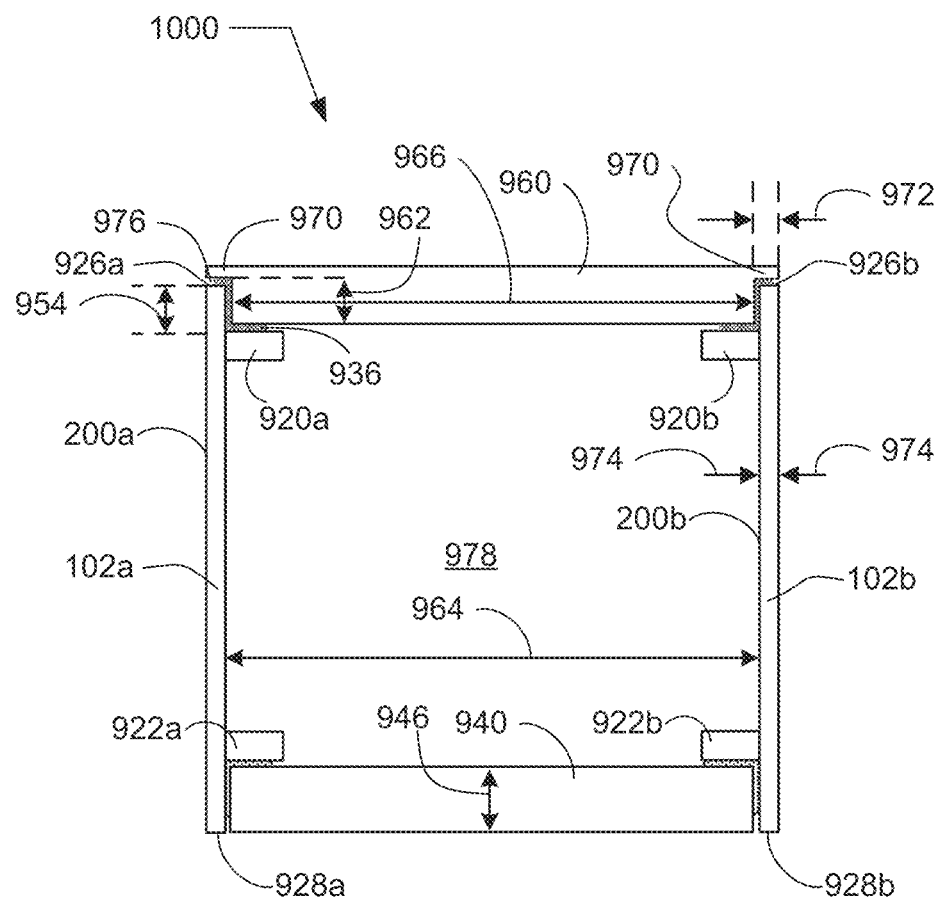
FIG. 10 is a sectional view of a portion of another an exemplary channel letter.

FIG. 10 is a sectional view of a portion of another exemplary channel letter. A portion of a channel letter 1000 is shown, having the profiles 200, similar to the channel letter 900 described above. The portion of the channel letter 1000 shown can be another embodiment taken along the line 9-9 of FIG. 16. The profiles 200 may be formed from a single section of profile 200 that is bent or folded back on itself to form the channel letter 1000.

In certain embodiments, the channel letter 1000 can have the ribs 920 and the ribs 922 that are spaced in a similar fashion as in the channel letter 900. The ribs 920 can be separated from the top edge 926a and a top edge 926b by a distance 954. The distance 954 may be similar to the distance 924 (FIG. 9). The profile 200a (e.g., the rule 102a and the rib 920a) and the profile 200b (e.g., the rule 102b and the rib 920b) can be spaced apart by a distance 964.

The channel letter 1000 can also have a face plate 960. The face plate 960 can further have a face plate width 966 that is slightly smaller than the distance 964 to receive the face plate 960 in a clearance fit, similar to FIG. 9. The face plate 960 can also have a face plate thickness 962 slightly smaller than the distance 954.

The face plate 960 can also have a lip 970. The lip 970 can be formed about a perimeter of the face plate 960. In some embodiments, the lip 970 can be sized to overlap the top edges 926 of the profiles 200 such that it covers the top edges 926 of the profiles 200. The lip 970 can have a lip depth indicated by the arrows 972 (referred to herein after as lip depth 972). The lip depth 972 can be slightly larger than a profile thickness, indicated by the arrows 974 (hereinafter profile thickness 974). The profiles 200 can thus be spaced apart to receive the face plate 960 with a clearance fit. The clearance fit may leave a small gap 976 into which the adhesive 936 may be added. The adhesive 936 may be added prior to installing the face plate 960 to the folded profiles 200.

In some embodiments, the lip 970 in conjunction with the adhesive 936 and the top edge 926 may further serve to create a sealed space 978 beneath the face plate 960. Similar to the face plate 930, the face plate 960 can be translucent or transparent so as to allow light to penetrate the face plate 960.

In some other embodiments, the channel letter 1000 can further have the bottom plate 940 as shown in FIG. 9. In another embodiment, the bottom plate 940 can be formed similar to the face plate 960. Such an embodiment may resemble the channel letter 900 with the lip 970 covering the bottom edges 928.

Figure 11:
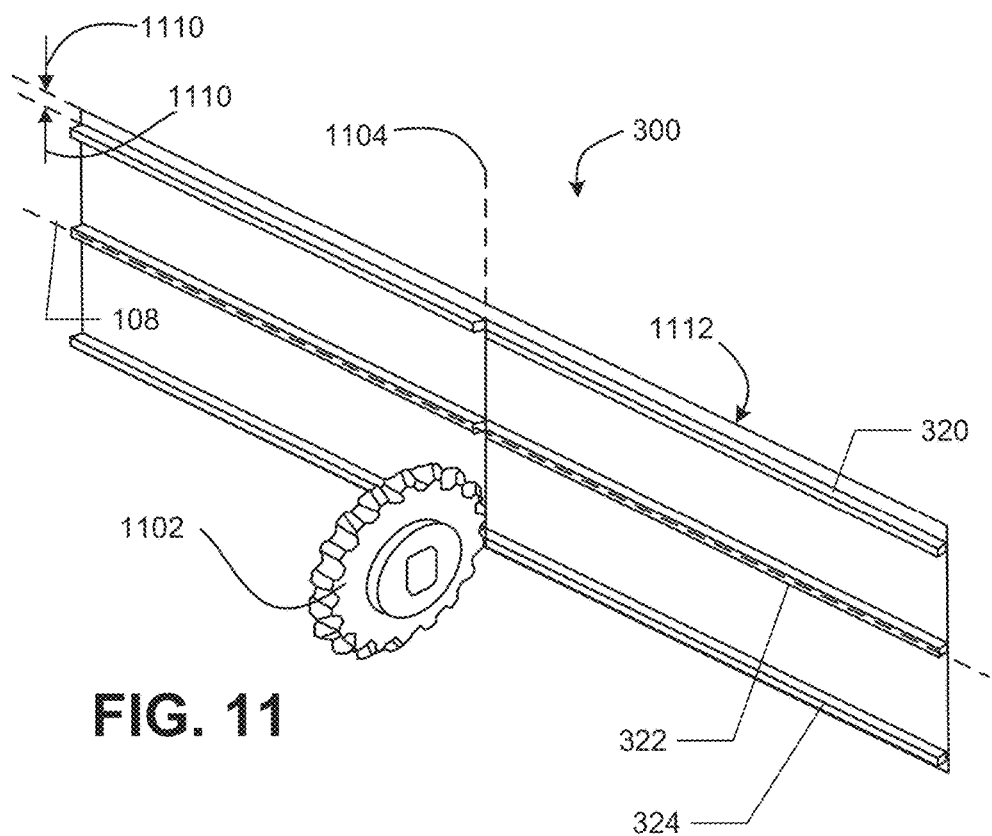
FIG. 11 is a perspective view of a cutting unit engaged with a profile.

FIG. 11 is a perspective view of a cutting unit engaged with a profile. A cutting unit 1102 is shown engaged with the profile 300 to make a cut in each of the ribs 320, 322, 324. While the profile 300 is shown in this figure, any of the profiles described herein can be used (cut) in such a manner. In some embodiments, the cutting unit 1102 can be a portion of a larger machine that can supply, cut, and fold the profile 300 into a desired channel letter (e.g., the channel letters 900, 1000).

The ribs 320, 322, 324 can provide a degree of structural support and rigidity to the profile 300. Due to the orientation of the ribs 320, 322, 324 along the profile axis (e.g., the profile axis 108 of FIG. 1) and the additional thickness of the ribs 320, 322, 324, accurate folding of the profile 300 in a direction orthogonal to the profile axis 108 can be impeded. Thus certain types and numbers of cuts to the ribs 320, 322, 324 may facilitate bending the profile 300 in a variety of bends or curves to create the desired channel letter (e.g., the channel letter 900, 1000).

The rib 320 can also be separated from a top edge 1112 of the profile 300 by a distance indicated by arrows 1110 (hereinafter, "distance 1110"). The distance 1110 can be similar to the distance 924 (FIG. 9) and sized to receive and accommodate the face plate 930 or the face plate 960. The adhesive 936 can then be employed to secure the face plate 930 or the face plate 960 in place.

Figure 12:
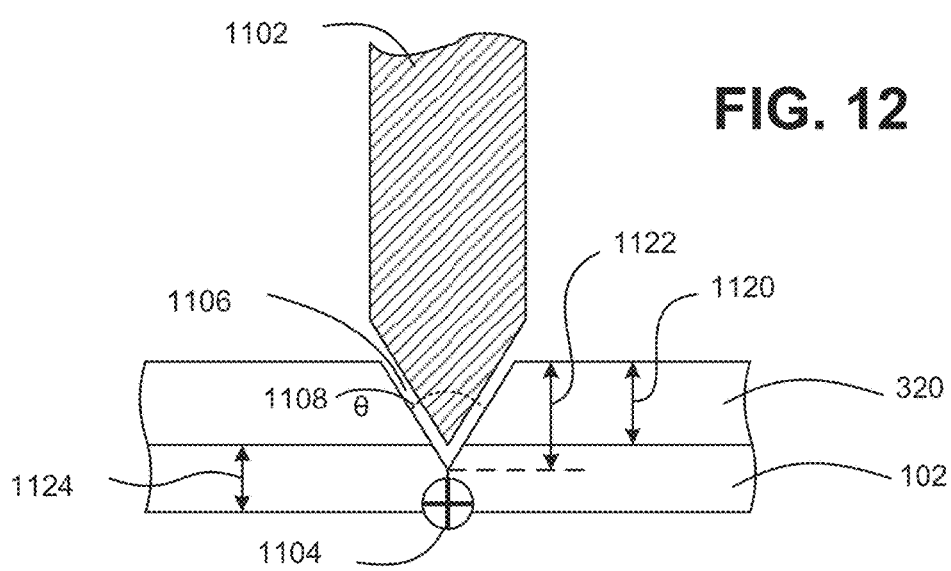
FIG. 12 is a sectional view of the cutting unit engaged with a profile.

As shown, the cutting unit 1102 is engaged with the profile 300 at a position indicated by a line 1104 (indicated by a dashed line). In some embodiments, the cutting unit 1102 can be a saw, that rotates (cuts) in a direction substantially transverse to the profile axis 108. The line 1104 extends orthogonal to the profile axis 108 and through each of the ribs 320, 322, 324. The cutting unit 1102 may then be moved into position to create a cut 1106 (see FIG. 12) along the line 1104. The cut 1106 removes a portion of each of the ribs 320, 322, 324. In some embodiments, the cutting unit 1102 can further score the rule 102 (FIG. 12). In an embodiment, the cutting unit 1102 penetrates the ribs 320, 322, 324 and scores the rule 102, but does not cut completely through the profile 300 (or the rule 102).

In some embodiments, the cut 1106 is a triangular cut or a v-shaped cut. The cut can be oriented with the narrow end of the V-shape toward the rule 102. The open end of the cut 1106 is then oriented away from the rule 102, toward the cutting unit 1102. Additionally, the triangular shape can be defined by a size and shape of the cutting unit 1102. The size and shape of the cut 1106 can also dictate an angle through which the profile 300 can be bent following the cut 1106.

FIG. 12 is a sectional view of the cutting unit engaged with a profile. The cutting unit 1102 is shown cutting the rib 320 of the profile 300, similar to FIG. 11 above. As noted previously, any of the foregoing profiles 100, 200, 300, 400 can be implemented in such a way.

As shown, the rib 320 has a v-shaped portion cut away or removed by the cutting unit 1102. The v-shaped cut 1106 is centered at the line 1104. The line 1104 is depicted as a crosshairs indicating the line 1104 extends out of the page.

Each of the ribs 320, 322, 324 can have a rib height 1120. The rib height 1120 can be from one (1) mm to in excess of three (3) mm of additional thickness to the rule. The rib height 1120 of the individual ribs 320, 322, 324 may be different from one another. The rule 102 can further have a thickness 1124. The rule thickness 1124 of 0.2 to 1.5 millimeters (mm), for example the thickness 974 of FIG. 10.

In some embodiments, the depth of the cut 1106 can extend through the rib 320 to a cut depth 1122, thus scoring the rule 102. In some other embodiments, the cut depth 1122 may be equal to the rib height 1120. This flexibility may provide certain options for folding the profile 300. As shown, the cut 1106 has an angle 1108 (shown in dashed lines and represented by the Greek letter, θ). The angle 1108 can be related to the shape of the cutting unit 1102. As a non-limiting example, the angle 1108 can be approximately 80 degrees. Accordingly, the profile can be bent or folded at the line 1104 through the angle 1108 (80 degrees) without interference from the rib 320. In such an embodiment, the resulting profile can be folded 80 degrees to achieve a 260 corner in the profile 300. Additional cuts 1106 may be repeated on either side of the line 1104 to create more aggressive bends or curves. The angle 1108 can be determined or selected based on a profile of the cutting unit 1102. Different angles 1108 can generate different types of bends in the finished channel letter 900, 1000. In another embodiment, the cut 1106 may be another shape, such as a round or rectangular cut, depending on the type and style of cutting unit implemented and the types and angles desired.

Figure 13:
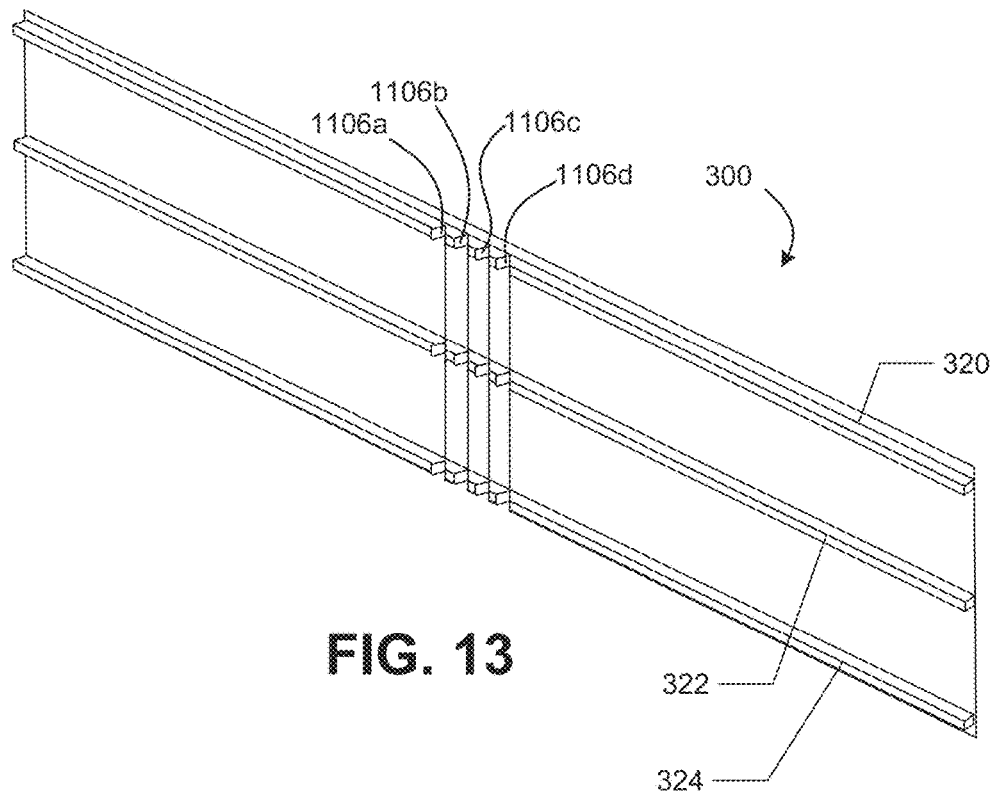
FIG. 13 is a perspective view of a portion of a profile with multiple cuts.

FIG. 13 is a perspective view of a portion of a profile with multiple cuts. The profile 300 is shown with four cuts 1106a-1106d. The multiple adjacent cuts 1106a-1106d can be used to form a curved portion of a channel letter. For example, the letter "P" may be formed in a channel letter. The letter "P" has two 180 degree curves (inside curve and an outside curve) that may be formed using the multiple cuts 1106a-1106b.

Figure 14:
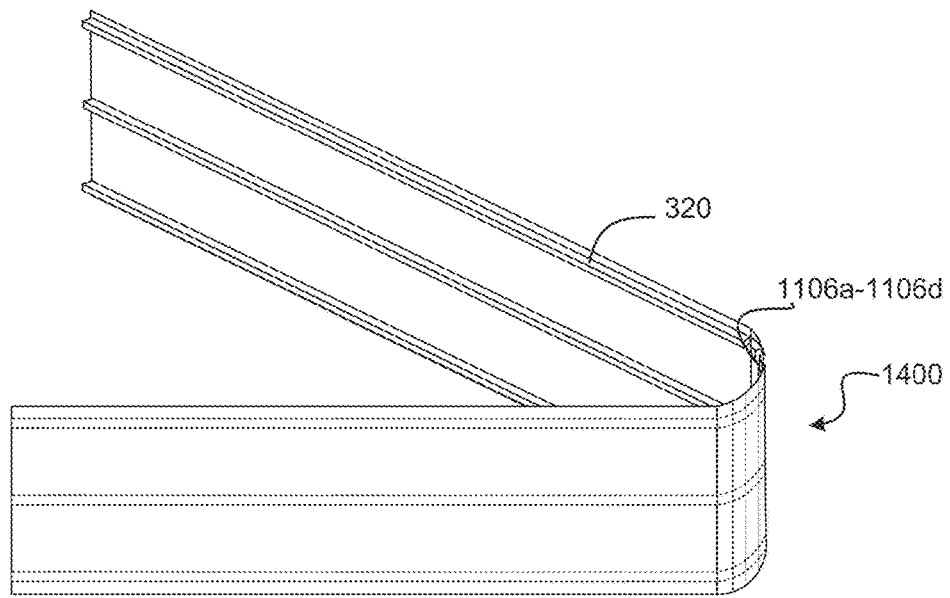
FIG. 14 s a perspective view of the profile of FIG. 13 folded about multiple cuts.

FIG. 14 is a perspective view of the profile of FIG. 13 folded about multiple cuts. With multiple cuts 1106a-1106d as shown in FIG. 13, the profile 300 can be bent to form a curve 1400 as shown. The single cut 1106 (FIG. 12) may only allow a single bend at the line 1104 for a maximum of the angle 1108, possibly resulting in a hard angle (as opposed to a curve), for example in a letter "K" or the bottom of the letter "P." In some embodiments, the rib 320 may be displaced from the top edge 1112 by the distance 1110 as described above. The rib 320 having the cuts 1106a-1106d that forms the curve 1400 can then also support the face plate 930 or the face plate 960. Accordingly, the face plate 930 or the face plate 960 can have a perimeter matching the curve 1400.

FIG. 15 is a perspective view of a channel letter formed from a profile. An incomplete channel letter 1500 resembles an incomplete letter "K," open at the top. The letter "K," for example, can be made from the profile 200 (FIG. 2). The incomplete channel letter 1500 can also be formed from the other profiles, such as the profile 100, the profile 300, and the profile 400, or other types of profiles. The use of the letter "K" is merely for an example, and should not be considered limiting. Any letter, number, symbol, or form can be bent or folded. The incomplete channel letter 1500 is open at the top, where a first end 1502 can be secured to a second end 1504 to complete the incomplete channel letter 1500. The first end 1502 can be secured to the second end 1504 by the use of an adhesive similar to the adhesive 936 or the adhesive 610. Such adhesives 610, 936 can be specially formulated for use with composites, enamel coatings, or other synthetic materials or such as plastic, acrylic, or other polymers. Due to the metal construction of the rule 102, metal welding the first end 1502 to the second end 1504 may be a further option to close the top of the letter "K."

FIG. 16 is a perspective view of the completed channel letter of FIG. 15 fitted with a face plate. In an embodiment, the first end 1502 and the second end 1504 are secured together to form a channel letter 1600. The channel letter 1600 can then be fitted with a face plate 1650. The face plate 1650 can be similar to the face plate 930 or the face plate 960. The channel letter 1600 has channel perimeter 1602 described by the top edge 926 of the profile 200 used to generate the channel letter 1600. The face plate 1650 can have a face perimeter 1604 that can be the same or slightly smaller than the channel perimeter 1602. The face plate 1650 can then be inserted into the channel letter 1600 and contained within the channel perimeter 1602 in a clearance fit.

The face plate 1650 can have the face plate thickness 934 (FIG. 9) that is sized to fit between the top rib 220 and the top edge 926 (FIG. 9). The top rib 220 can also be similar to the top rib 920a or the top rib 920b of FIG. 9. The face plate 1650 can be formed to fit within the channel letter 1600 and secured in place using the adhesive 936, as described above. In some embodiments, the face plate 1650 can fit flush with the top edge 926. In some other embodiments, the face plate 1650 can be formed with the lip 970 as in FIG. 10 to provide a finished look, covering the top edges 926. As noted previously in connection with FIG. 9, the use of the profile 200 is exemplary. The channel letter 1600 can be formed using other embodiments of the profile 100, 200, 300, 400 having at least one rib, e.g., the rib 120, the rib 220, the rib 320, or the ribs 420. Different numbers of ribs 120 can be selected based on design preference or application.

Figure 17:
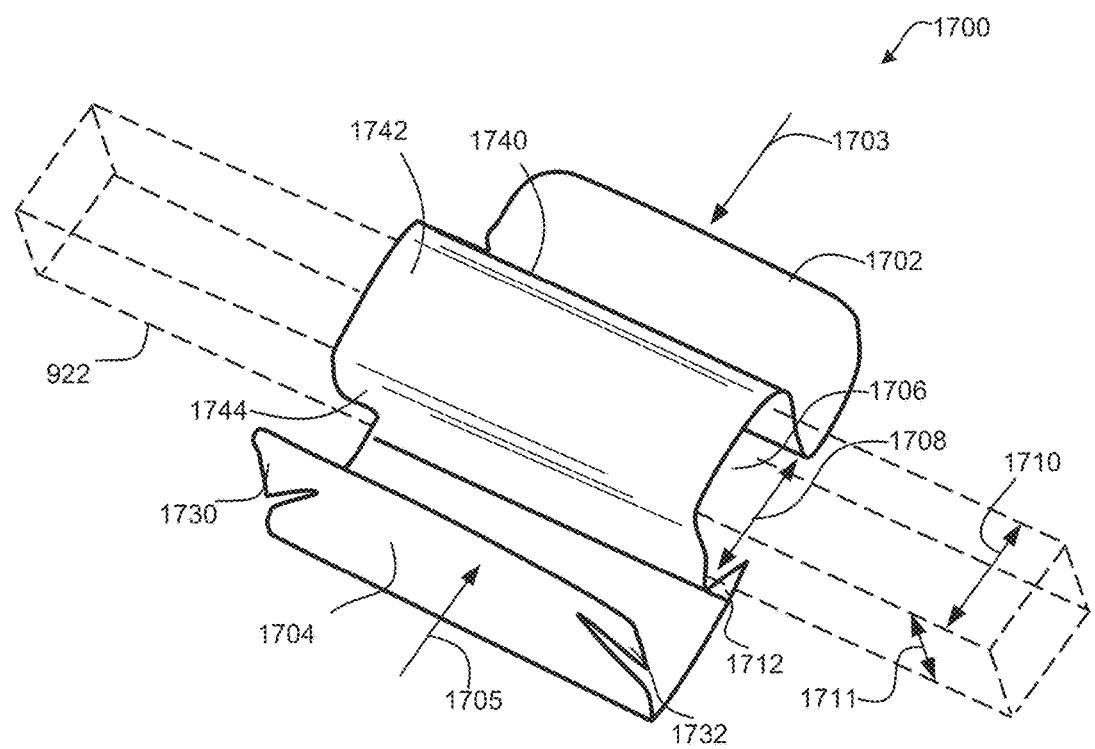
FIG. 17 is a perspective view of a bottom plate clip used to secure a bottom plate of a channel letter.

FIG. 17 is a perspective view of a bottom plate clip used to secure a bottom plate of a channel letter. A bottom plate clip ("clip") 1700 is shown installed on the rib 922 (shown in dashed lines). The examples and embodiments of the following description are generally directed to the use of the clip 1700 on the bottom plate of a channel letter (e.g., the channel letter 1600). However, in some embodiments, the clip 1700 can also be used for securing a top plate (e.g., the top plate 930) to the profile (e.g., the profile 200). The clip 1700 can also, in some embodiments, be used to secure an intermediate plate (not shown) to an intermediate rib (e.g., the rib 322 (FIG. 3)).

The rule 102 is not shown in this figure, though the rib 922 in some embodiments, the rib 922 is attached to the rule 102 as described above. Although only a single clip 1700 is shown in this figure, it should be appreciated that a plurality of clips 1700 can be installed on the channel letter 1600, for example. The plurality of clips 1700 can secure the bottom plate 940 in place.

The clip 1700 can have a top tab 1702 and a bottom tab 1704 disposed on opposite ends of the clip 1700. The clip 1700 can also have a top gap 1706 sized to receive the rib 922 (FIG. 2). The top gap 1706 can be defined by a top panel 1740, an inside panel 1742 and a middle panel 1744. Each of the top panel 1740, the inside panel 1742, and the middle panel 1744 is defined by a corresponding bend or fold, described in connection with FIG. 21.

In some embodiments, the top gap 1706 can have a top gap width 1708 approximately equal to a rib width 1710 of the rib 222. The top gap 1706 can further have a top gap depth 1709 (shown in FIG. 19) approximately equal to the rib thickness 1711. In some embodiments, the top gap 1706 can receive the rib 922 in a clearance fit. In some other embodiments the top gap 1706 can be sized to receive the rib 922 with an interference fit ensuring a snug and secure fitment. An intended user can apply pressure to the top tab 1702 and the bottom tab 1704 in the directions indicated by arrows 1703, 1705 to temporarily increase the size of the top gap 1706 during installation. In some other embodiments, the clip 1700 can be formed from a metal having elastic characteristics such that the clip 1700 and the top gap 1706 return to their original size and shape when the pressure from the top tab 1702 and the bottom tab 1704 is released.

The clip 1700 can also have barbs 1712, 1714. FIG. 17 only shows the barb 1712; the barb 1714 is obscured by the perspective but shown in FIG. 18. The barbs 1712, 1714 can be inserted between the rib 922 and the rule (not shown) during installation. The barbs 1712, 1714 can then provide additional security to maintain the position of the clip 1700 once installed. The clip 1700 can also have barbs 1730, 1732. The barbs 1730, 1732 are described in more detail in connection with FIG. 19 and FIG. 20 below.

Figure 18:
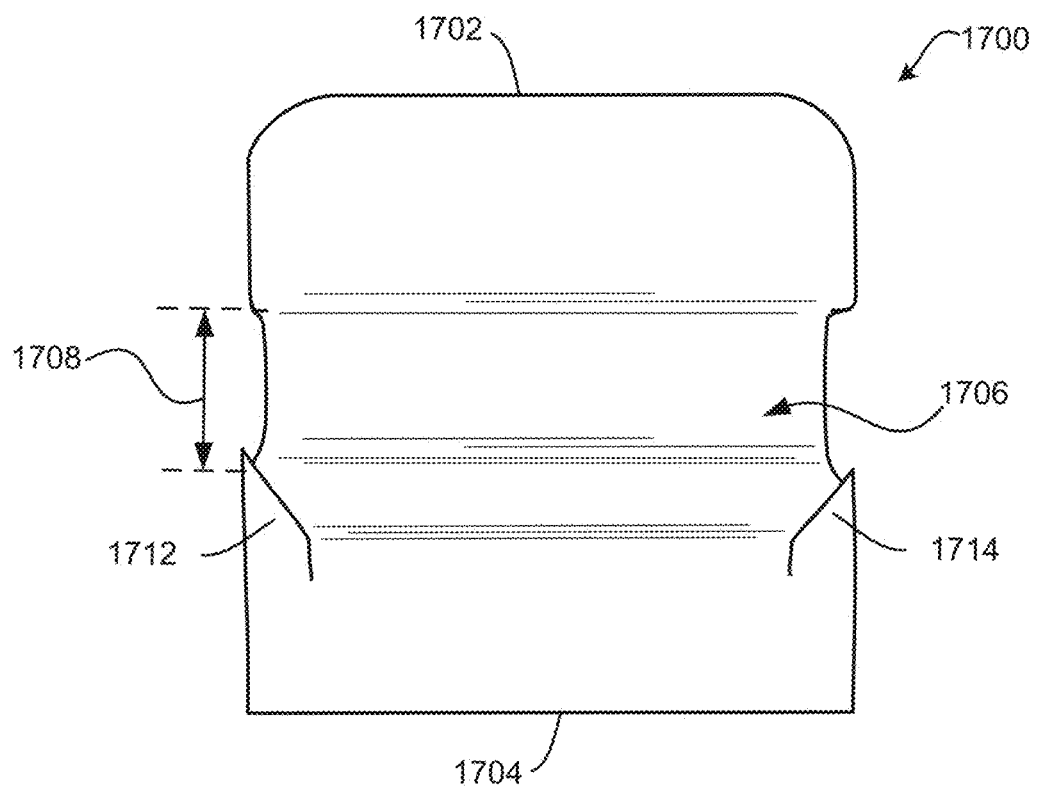
FIG. 18 is a rear plan view of the bottom plate clip of FIG. 17.

FIG. 18 is a rear plan view of the clip 1700 of FIG. 17. As shown, the barbs 1712, 1714 are positioned on the outer portions of the clip 1700 and formed to fit between the rib 922 and the rule 102. The barbs 1712, 1714 can have sharp points such that they can protrude into the adhesive 610 (FIG. 6) if necessary. The side of the clip 1700 shown in this figure can be disposed against the profile 102 in use.

Figure 19:
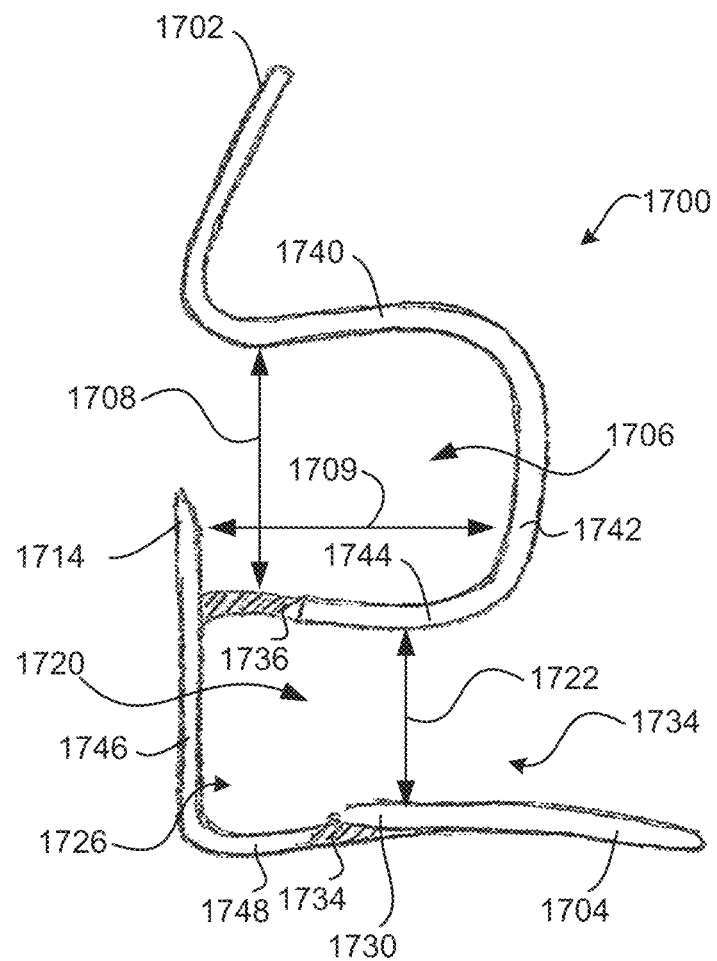
FIG. 19 is a side plan view of the bottom plate clip of FIG. 17.

FIG. 19 is a side plan view of the bottom plate clip of FIG. 17. The clip 1700 is shown with the top gap 1706 and the barbs 1712, 1714. The clip 1700 can also have a bottom gap 1720. The bottom gap 1720 can be defined by the middle panel 1744, an outside panel 1746, and a lower panel 1748.

In some embodiments, the second, bottom gap 1720, can be sized to receive the bottom plate 940 (not shown), for example. The bottom gap 1720 can have a bottom gap width 1722 that can be approximately equal to the bottom plate thickness 946 (FIG. 10). In some embodiments, the bottom gap width 1722 can be slightly smaller than the bottom plate thickness ensuring an interference fit. In some other embodiments, the bottom tab 1704 can be curved (as shown) such that an open end 1724 of the bottom gap 1720 is slightly smaller than a closed end 1726 of the bottom gap 1720. In such an embodiment, the elastic nature of the metallic material comprising the clip 1700 can firmly grip the bottom plate 940, in use. This is shown in greater detail in FIG. 20.

The clip 1700 can also have barbs 1730, 1732. The barb 1732 is not shown in this perspective. Similar to the barbs 1712, 1714, the barbs 1730, 1732 can secure the bottom plate 940 in position. Due to the curve present in the bottom tab 1704, when the bottom plate 940 is inserted into the bottom gap 1720, the barbs 1730, 1732 can provide an amount of friction sufficient to prevent the bottom plate 940 from sliding out of the bottom gap 1720. In some embodiments, the barbs 1730, 7132 can penetrate into the surface of the bottom plate 940 forming a more permanent structure.

In some embodiments, the clip 1700 can be formed from a single piece of metal. Accordingly, small cuts can be made in the metal prior to folding the clip 1700. As shown, a mask 1736 and a mask 1738 indicate areas where the metal can be cut prior to folding the clip 1700 and exposing the barbs 1714, 1730. The associated method is described in connection with FIG. 22.

Figure 20:
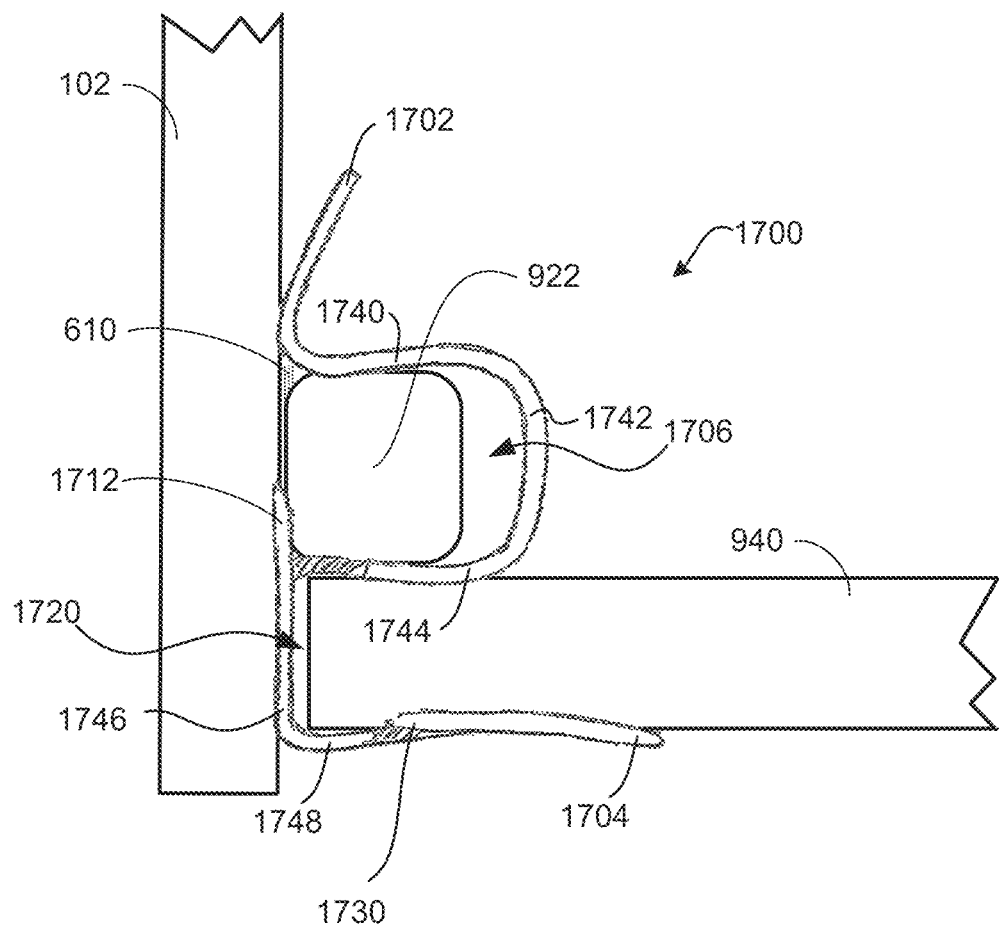
FIG. 20 is a sectional view of the bottom plate clip of FIG. 17 and the interaction with a rib and a bottom plate.

FIG. 20 is a sectional view of the bottom plate clip of FIG. 17 and the interaction with a rib and a bottom plate. The clip 1700 can be installed onto the rib 922 of the profile 900, for example. The barbs 1712, 1714 can be inserted between the rib 922 and the rule 102. In some embodiments, the barbs 1712, 1714 can penetrate into the adhesive 610.

In some embodiments, once the clip 1700 is installed onto the rib 922, the bottom gap 1720 is then available to receive the bottom plate 940. As shown, the bottom plate 940 can be secured with an interference fit. The barbs 1730, 1732 can provide addition friction to secure the bottom plate 940. The clip 1700 can be used repeatedly around, for example, the bottom rib 922 of the channel letter 1600 (FIG. 16). The clip 1700 can also be used on the other embodiments described herein. The clip 1700 can be used in large numbers around the inner perimeter of the channel letter 1600 to secure the bottom plate 940 in place.

Figure 21:
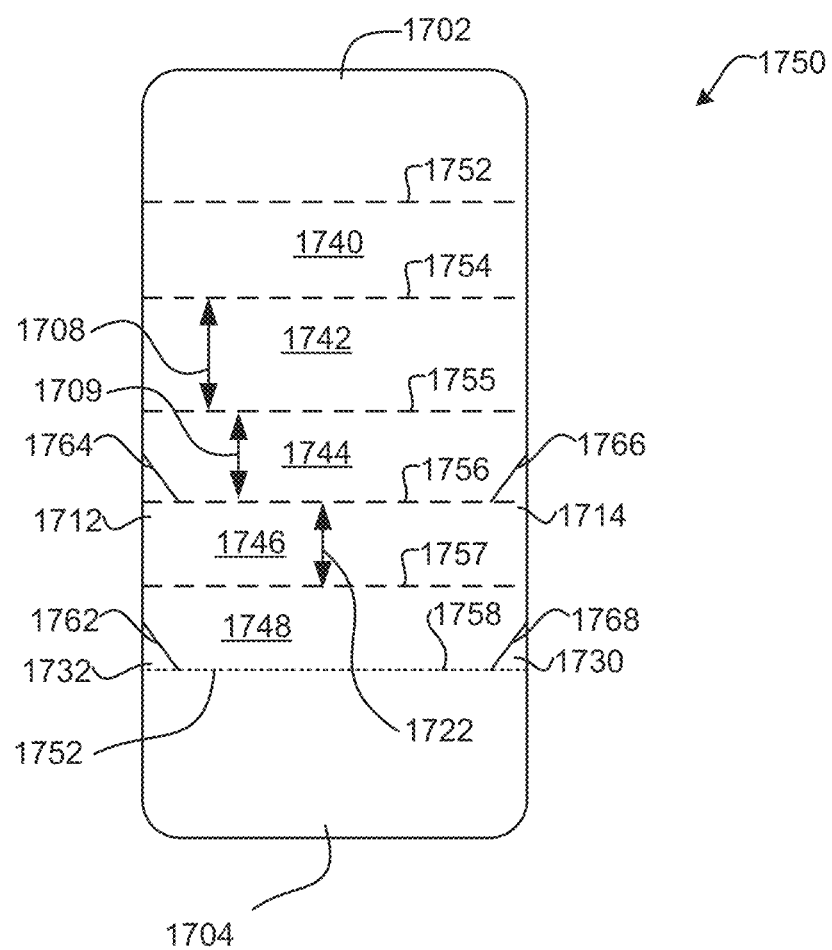
FIG. 21 is a top plan view of a bottom plate clip form.

FIG. 21 is a top plan view of a bottom plate clip form ("clip form"). A clip 1700 can be formed from a clip form 1750. The clip form 1750 can be cut or formed from a small portion of metal that can be sized and folded or bent to form the clip 1700. In some embodiments, the barbs 1712, 1714, 1730, 1732 can result from small cuts 1762, 1764, 1766, 1768 (depicted as diagonal lines) in the clip form 1750.

Once the small cuts 1762, 1764, 1766, 1768 are made, the clip form 1750 can be folded or bent along the dashed lines 1752, 1754, 1755, 1756, 1757 to form each of the top panel 1740, the inside panel 1742, and the middle panel 1744, the outside panel 1746, and the lower panel 1748. The dimensions of each of the above mentioned panels can vary depending on the size of the rib 922 and the bottom plate thickness 946. For example, the inside panel 1742 can have a width substantially equal to the top gap width 1708. Similarly, the middle panel 1744 can have a width substantially equal to the top gap depth 1709, and the outside panel 1746 can have a width substantially equal to the bottom gap width 1722. A bend along a (dotted) line 1758 can also be present. Once each of the folds is completed at the dashed lines and the line 1752, the folds expose the barbs 1712, 1714, 1730, 1732 as shown the foregoing figures.

Figure 22:
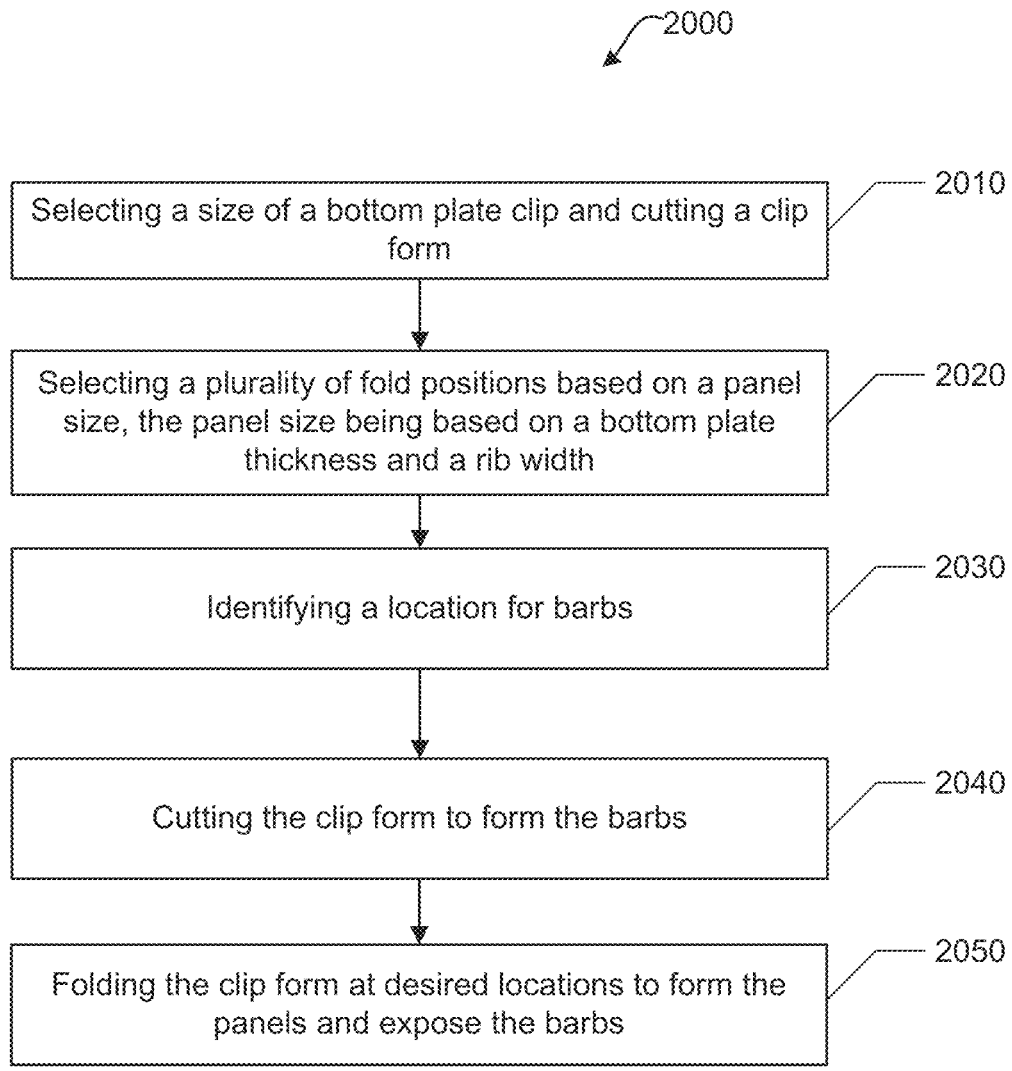
FIG. 22 is a method for making the bottom plate clip of FIG. 17.

FIG. 22 is a flowchart of a method for making the bottom plate clip 1700. A method 2000 can begin at block 2010 with selecting a size of the clip 1700. As noted above, the clip 1700 can be formed from a single piece of metallic material. The size and shape of the clip form 1750 can dictate the overall size of the clip 1700.

At block 2020, a plurality of fold positions can be selected. The plurality of fold positions can be based on a size of each of the top panel 1740, the inside panel 1742, and the middle panel 1744, the outside panel 1746, and the lower panel 1748, which can be selected based on the bottom plate thickness 946 and the rib width 1710.

At block 2030, the location for the barbs can be selected based on the rib width 1710 and the bottom plate thickness 946. At block 2040, the barbs can be cut or punched into the clip form 1750 at the desired locations. At block 2050, the clip form 1750 can be folded at the desired locations, forming the top panel 1740, the inside panel 1742, and the middle panel 1744, the outside panel 1746, and the lower panel 1748 and exposing the barbs 1712, 1714, 1730, 1732.

The above descriptions of the disclosed embodiments are provided to enable any person skilled in the art to make or use the disclosure. Various modifications to these embodiments will be readily apparent to those skilled in the art, and the generic principles described herein can be applied to other embodiments without departing from the spirit or scope of the disclosure. For example, although the clip is described as providing a mounting surface for the bottom plate, the clip can be used to provide a mounting surface for other plates such as top plate, middle plate, or any other plates. Thus, it will be understood that the description and drawings presented herein represent embodiments of the disclosure and are therefore representative of the subject matter which is broadly contemplated by the present disclosure. It will be further understood that the scope of the present disclosure fully encompasses other embodiments that may become obvious to those skilled in the art and that the scope of the present disclosure is accordingly limited by nothing other than the appended claims.

Accordingly, the foregoing embodiments are merely presented as examples and are not to be construed as limiting the present disclosure. The present teachings can be readily applied to other types of apparatus and/or devices. The description of the present disclosure is intended to be illustrative, and not to limit the scope of the claims. Many alternatives, modifications, and variations will be apparent to those skilled in the art.

What is claimed is:

1. A device for securing a plate to a channel letter, the device comprising:
   a top gap having a top gap width and a top gap depth and sized to receive a rib, the rib being adhered to a profile used to make a channel letter;
   a bottom gap oriented opposite to the top gap and sized to receive the plate of the channel letter;
   a first plurality of barbs, each barb of the first plurality of barbs being oriented toward an inside of the top gap and configured to fit between the rib and the profile; and
   a second plurality of barbs, each barb of the second plurality of barbs oriented toward an inside of the bottom gap and configured to penetrate a surface of the plate.

2. The device of claim 1, wherein the plate is a bottom plate.

3. The device of claim 1, wherein the top gap width is substantially equal to a thickness of the rib.

4. The device of claim 1, wherein the top gap depth is substantially equal to a width of the rib.

5. The device of claim 1, wherein the bottom gap includes a width substantially equal to a thickness of the plate.

* * * * *